United States Patent [19]

Nakamura

[11] Patent Number: 4,748,191

[45] Date of Patent: May 31, 1988

[54] PROCESS FOR PREPARING PRE-EXPANDED PARTICLES OF THERMOPLASTIC RESIN

[75] Inventor: Kyoichi Nakamura, Ibaraki, Japan

[73] Assignee: Kanegafuchi Kagaku Kogyo Kabushiki Kaisha, Osaka, Japan

[21] Appl. No.: 8,885

[22] Filed: Jan. 30, 1987

[30] Foreign Application Priority Data

Jan. 30, 1986 [JP] Japan .................................. 61-18928

[51] Int. Cl.$^4$ .............................................. C08J 9/22
[52] U.S. Cl. ...................................... 521/58; 521/60; 521/146
[58] Field of Search ................................... 521/58, 60

[56] References Cited

U.S. PATENT DOCUMENTS

| | | | |
|---|---|---|---|
| 4,436,840 | 3/1984 | Akiyama et al. | 521/58 |
| 4,448,901 | 5/1984 | Senda et al. | 521/58 |
| 4,464,484 | 8/1984 | Yoshimura et al. | 521/58 |

*Primary Examiner*—Morton Foelak
*Attorney, Agent, or Firm*—Armstrong, Nikaido, Marmelstein & Kubovcik

[57] ABSTRACT

In a process for preparing pre-expanded particles of a thermoplastic resin which comprises releasing into a low pressure zone an aqueous dispersion of thermoplastic resin particles containing a volatile blowing agent, the dispersion being maintained at an elevated temperature under pressure in a pressure vessel, the improvement which comprises releasing the dispersion through an orifice having a ratio of the length to the average diameter of 4 to 100. According to the present invention, the pre-expanded particles having cells which are uniform in diameter and have an average dimeter of not less than 200 μm can be obtained, and therefore the articles molded in a mold from the pre-expanded particles are small in the shrinkage and strain, are excellent in the appearance, and are increased in the productivity. Accordingly, the molded articles are utilizable for use of shock absorbing, wrapping materials or structural material such as impact-absorbing materials for cars which requires excellent dimensional precision and heat insulating building materials.

6 Claims, 1 Drawing Sheet

PROCESS FOR PREPARING PRE-EXPANDED PARTICLES OF THERMOPLASTIC RESIN

BACKGROUND OF THE INVENTION

The present invention relates to a process for preparing pre-expanded particles of a thermoplastic resin, and more particularly to in a process for preparing pre-expanded particles of a thermoplastic resin which comprises releasing into a low pressure zone an aqueous dispersion of thermoplastic resin particles containing a volatile blowing agent, the dispersion being maintained at an elevated temperature under pressure in a pressure vessel, the improvement which comprises releasing the dispersion through an orifice having a ratio of the length to the average diameter of 4 to 100.

The pre-expanded particles of thermoplastic resin obtained according to the process of the present invention are uniform and large in diameter of cells, and accordingly have excellent expansion moldability in a mold.

As to process for pre-expanding particles of thermoplastic resins, there have hitherto been adopted processes disclosed in, for instance, Japanese Examined patent publication No. 1344/1981, DE-OS No. 2,107,683, and the like, and there have been obtained pre-expanded particles which can be used in expansion molding in a mold by means of the above processes.

However, the cells of the pre-expanded thermoplastic resin particles prepared by the above processes have generally a diameter of not more than 200 $\mu$m. When the expansion molding is carried out in a mold by using the pre-expanded particles having a cell diameter of not more than 200 $\mu$m, the obtained molded articles have defects that the shrinkage is large and their shapes are strained, which are generally known as "shrinkage or depression" or "camber" in the art. Accordingly, the value of products and the productivity of the molded articles are lowered.

It is an object of the present invention is to solve the above mentioned disadvantages.

The above and other objects of the present invention will become apparant from the description hereinafter.

SUMMARY OF THE INVENTION

It has now been found that in a process for pre-expanding thermoplastic resin particles which comprises releasing an aqueous dispersion of thermoplastic resin particles containing a volatile blowing agent into a low pressure zone, only when the aqueous dispersion is released through an orifice having a ratio of the length to the average diameter of 4 to 100 into a low pressure zone, there can be obtained pre-expanded thermoplastic resin particles having cells which are uniform in diameter and have an average diameter of not less than 200 $\mu$m, and the above-mentioned disadvantages can be solved by using the thus obtained pre-expanded particles.

In accordance with the present invention, there is provided in a process for preparing pre-expanded particles of a thermoplastic resin which comprises releasing into a low pressure zone an aqueous dispersion of thermoplastic resin particles containing a volatile blowing agent, the dispersion being maintained at an elevated temperature under pressure in a pressure vessel, the improvement which comprises releasing the dispersion through an orifice having a ratio of the length to the average diameter of 4 to 100.

DETAILED DESCRIPTION

Figure 1:
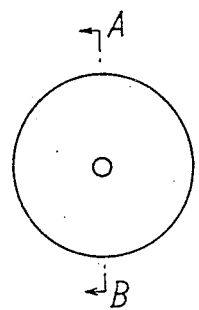
FIG. 1 is a front view showing an embodiment of an orifice member in accordance with the present invention.

Since the cells of the pre-expanded thermoplastic resin particles obtained by the process of the present invention have a diameter of not less than 200 $\mu$m, when the expansion molding in a mold is carried out by using the pre-expanded particles, the shrinkage of the obtained molded articles is about 2 % smaller than that of molded articles obtained by conventional pre-expanding methods. Therefore, the above-mentioned disadvantages can be solved by the present invention.

Examples of the thermoplastic resin used in the invention are, for instance, styrene polymers such as polystyrene, poly-$\alpha$-methylstyrene, a copolymer of styrene and maleic anhydride, a blend of polyphenyleneoxide and polystyrene, a graft-copolymer of polyphenyleneoxide and polystyrene, a copolymer of acrylonitrile and styrene, a terpolymer of acrylonitrile, butadiene and styrene, a copolymer of styrene and butadiene, and a high impact polystyrene; vinyl chloride polymers such as polyvinyl chloride, a copolymer of vinyl chloride and vinyl acetate, a chlorinated polyvinyl chloride, and a copolymer of an olefin such as ethylene or propylene and vinyl chloride; polyamides, polyester resins, polyolefin resins, and the like.

Among them, the present invention is particularly suitable for pre-expansion of polyolefin resins, the resins having a large gas permiability and a glass transition point of less than room temperature and their molded articles being easily shrunk or easily strained in a shape upon expansion molding in a mold.

Examples of the polyolefin resins are, for instance, polypropylene resins such as a random-copolymer of ethylene and propylene, a random terpolymer of ethylene, propylene and butene, a block copolymer of ethylene and propylene, and homopolypropylene, polyethylene resins such as a low density polyethylene, a medium density polyethylene, a high density polyethylene, a linear low density polyethylene, a copolymer of ethylene and vinyl acetate, a copolymer of ethylene and methyl methacrylate, an ionomer resin such as an ionomer resin of ethylene-methacrylic acid copolymer crosslinked with a metal ion in its molecule; another polyolefin resins such as poly-l-butene, polypentene, a terpolymer of ethylene, acrylic acid and maleic anhydride; and the like. The polyolefin resins may be used alone or in admixture thereof, and they may be used in the state of not only non-crosslinked rein but also crosslinked resin prepared by using peroxide or radiation.

Usually, the thermoplastic resins are previously melted by using an extruder, a kneader, a Banbury mixture, a roll, or the like, and are molded into particles having a desired shape such as a cylinder, a cylindroid, a sphere, a cube or a rectangular parallelapiped, and having an average particle diameter of 0.1 to 10 mm, preferably from 1 to 5 mm, in order to easily utilize for pre-expansion. The term "average particle diameter" as shown herein is the diameter of a sphere.

In the invention, examples of the volatile blowing agent contained into the thermoplastic resin are, for instance, aliphatic hydrocarbons such as propane, butane, pentane and hexane; alicyclic hydrocarbons such as cyclopentane and cyclobutane; halogenated hydrocarbons such as trichloromonofluoromethane, dichlorodifluoromethane, dichlorotetrafluoroethane, trichlorotrifluoroethane, methyl chloride, methylene chloride and ethyl chloride; and the like. The blowing agent may be used alone or in admixture thereof. The amount of the blowing agent used is not particularly limited and is suitably decided according to the desired expansion ratios of the pre-expanded particles of the thermoplastic resin. Usually, the amount of the blowing agent is from 5 to 50 parts by weight per 100 parts by weight of the thermoplastic resin.

At that time, the dispersing agent can be used. Examples of the dispersing agent are, for instance, basic calcium tertiary phosphate, basic magnesium carbonate, basic zinc carbonate, calcium carbonate, and in addition thereto, a slight amount of a surface active agent such as sodium dodecylbenzenesulfonate, sodium n-paraffinicsulfonate, or sodium α-olefinsulfonate, as a dispersing assistant. The amount of the dispersing agent used depends on the kinds of the dispersing agents and the thermoplastic resins and the amounts of the thermoplastic resin particles. Usually, the amount is from 0.2 to 3 parts by weight per 100 parts by weight of water.

It is preferable to use the thermoplastic resin particles containing the volatile blowing agent in an amount of 20 to 100 parts by weight per 100 parts by weight of water in order to satisfy the dispersibility in water.

The thus obtained aqueous dispersion is released into a low pressure zone through an orifice, the orifice having a ratio of the length to the average diameter of 4 to 100, thereby pre-expanding the thermoplastic resin particles to give the pre-expanded particles of the thermoplastic resin.

As aforementioned, the aqueous dispersion is heated under pressure in the pressure vessel. The pressure is usually from 15 to 50 g/cm$^2$G. The heating temperature depends on the kinds of the thermoplastic resin and is usually within the range of 90° to 180° C. The dispersion heated at the predetermined temperature is maintained for 20 to 60 minutes.

Any pressure vessels are applicable to the invention so long as the vessel can satisfactorily withstand the above mentioned pressure and heating conditions. Examples of the pressure vessel are, for instance, an autoclave, and the like.

Figure 2:
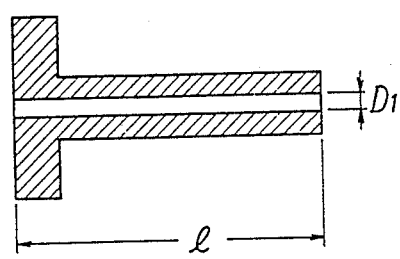
FIG. 2 is a cross-sectional view of FIG. 1 along the line A-B.

As the orifice having the ratio of the length to the average diameter of 4 to 100, there can be used, for instance, an orifice member having a shape shown in FIG. 1 as a front view and FIG. 2 as a cross-sectional view. In FIG. 2, l shows the length of the orifice member and $D_1$ shows the average diameter of the orifice member. The orifice member is provided in front of the releasing valve 6 in an apparatus for preparing the pre-expanded thermoplastic resin particles shown in FIG. 3. The valve 6 may be provided at any parts of the releasing pipe 5 so long as the orifice member is attached to the outlet of the releasing pipe 5. Also, the orifice may be directly provided at an outlet of the pressure vessel 1.

When the orifice has the ratio of the length (l) to the average diameter ($D_1$) is from 4 to 100, the cells of the obtained pre-expanded particles is uniform in a diameter and has an average diameter of not less than 200 μm. When the ratio is less than 4, the obtained pre-expanded particles has a cell diameter of not more than 200 μm. On the other hand, when the ratio is more than 100, though the obtained pre-expanded particles have a cell diameter of not less than 200 μm, cells which are ununiform in a diameter increase and expansion ratio varies widely. When the ratio of the length (l) to the average diameter ($D_1$) is from 10 to 40, the obtained pre-expanded particles have cells which has an average diameter of not less than 230 μm and are uniform. The average diameter of the orifice varies depending on amounts of the thermoplastic resin particles pre-expanded and sizes of the thermoplastic resin particles dispersed in water before pre-expanding, and is not absolutely specified. Usually, the average diameter is from 2 to 10 mm.

The orifice can have any shapes. Examples of the shapes are, for instance, a circle, a polygon such as a triangle, a quadrilateral or a pentagon, a star shape, an oval, a rectangle, an interminate form, or the like. Accordingly, the term "average diameter" of the orifice used herein is expressed by the diameter of a circle having the same sectional area as that of the orifice.

The orifice member has usually one orifice, but can have two or more orifices. It is preferable to use the orifice member having a purality of the orifices, since the production rate can be increased with maintaining the same cell diameter and cell structure of the pre-expanded particles as in case of using the orifice member having one hole.

The orifice member is prepared from any materials such as metals and nonmetals so long as the materials can withstand the pressure and temperature conditions upon pre-expanding the thermoplastic resin particles. From the point of the economy and durability, it is preferable to prepare the die from stainless steel or ceramics.

Figure 3:
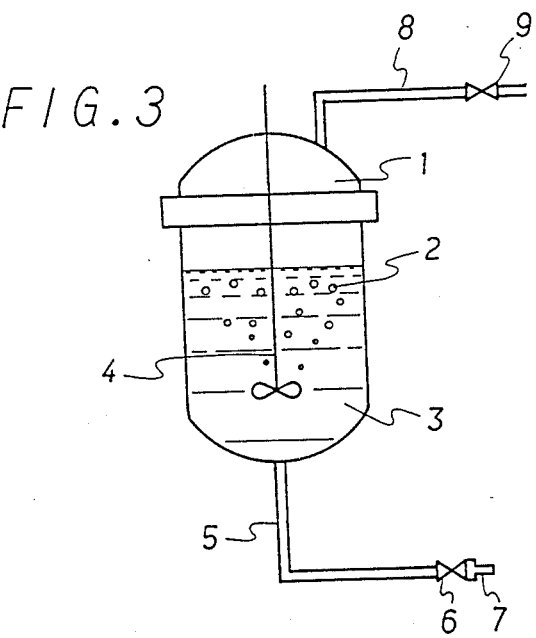
FIG. 3 is a schematic view showing an embodiment of a preparing apparatus used in the process of the present invention.

The process for preparing the pre-expanded thermoplastic resin particles of the present invention is more specifically explained by means of FIGS. 1 to 3, but the present invention is not limited thereto.

FIG. 3 is a schematic view showing an embodiment of a preparing apparatus used in the invention. In FIG. 3, the thermoplastic resin particles and the blowing agent are added into the pressure vessel 1 such as the autoclave together with a small amount of dispersing agent and water 3, and the mixture is dispersed with a stirrer 4. The pressure vessel 1 is heated to the predetermined temperature under the predetermined pressure, and is allowed for a prescribed period of time. The aqueous dispersion of the thermoplastic resin particles containing the volatile blowing agent 2 in the pressure vessel 1 is then released through the orifice member 7 attached to the outlet of the releasing pipe 5 into a low pressure zone (usually, atmospheric pressure) by opening the releasing valve 6 to give the pre-expanded thermoplastic resin particles having cells which are uniform and have an average diameter of not less than 200 μm. The average diameter of the orifice ($D_1$) is smaller than a diameter of the releasing pipe 5. A pipe 8 is a pipe for introducing the volatile blowing agent added for maintaining the inner pressure of the pressure vessel 1 at a pressure equal to the vapor pressure of the blowing agent before releasing during releasing the aqueous dispersion. A valve 9 is an introducing valve of a volatile blowing agent.

The pre-expanded thermoplastic resin particles obtained according to the present invention have usually a ratio of closed cells of not less than 80%. If necessary, the pre-expanded particles are heated under pressure for a prescribed period of time in the pressure vessel to impregnate with air into the pre-expanded particles. Then, the pre-expanded particles are charged into a mold which is able to be closed but unable to be sealed, in other words, a mold which is able to be closed but is permeable, and are molded by heating with steam to give a formed article having the same shape as the mold.

The thus obtained foamed articles are small in the shrinkage and the shape distortion, and accordingly are of great valve of products.

The present invention is more specifically described and explained by means of the following Examples and Comparative Examples in which all % and parts are by weight unless otherwise noted. It is to be understood that the present invention is not limited to the Examples and Comparative Examples, and various changes and modifications may be made in the invention without departing from the spirit and scope thereof.

EXAMPLES 1 TO 7 AND COMPARATIVE EXAMPLES 1 TO 4

A pressure vessel was charged with 100 parts of pellets of random copolymer of ethylene and propylene (commercially available under the commercial name "Noblen" made by Sumitomo Kagaku Kogyo Kabushiki Kaisha, ethylene content: 4.5%, a weight: about 1.3 mg/pellet), 35 parts of dichlorodifluoromethane, 1.5 parts of basic calcium tertiary phosphate powder and 0.006 part of sodium n-paraffinicsulfonate as dispersing agents and 300 parts of water, and the temperature of the mixture was raised to 136° C. with stirring. At that time, the inner pressure of the vessel was about 29.5 kg/cm$^2$G (gauge pressure, hereinafter the same).

Then, a valve provided at a lower part of the vessel was opened to release the aqueous dispersion into an atmospher of ordinary pressure through an orifice having the ratio of the length to the average diameter shown in Table 1. During the release, the inner pressure of the vessel was maintained at 29.5 to 30.0 kg/cm$^2$G by supplying dichlorodifluoromethane. The thus obtained pre-expanded particles had an expansion ratio of about 37 to about 40.

The pre-expanded particles were impregnated with air at 80° C. for 3.5 hours under a pressure of 8.5 kg/cm$^2$G (in air) to adjust the inner pressure of the pre-expanded particles of about 2.0 to about 2.5 atm., and filled in a plank mold having dimensions of 290 mm×270 mm×50 mm and heated for 20 seconds to 3 minutes by steam having a pressure of about 2.0 kg/cm$^2$G to give a molded articles.

An average cell size, a uniformity of cells, a dimensional shrinkage of molded article and a strain of shape of molded article are measured as follows:

[Average cell diameter]

There are randomly picked out 30 pieces of pre-expanded particles from the obtained particles and cell diameters are measured according to Japanese Industrial Standard (JIS) K 6402. An average diameter of cells (d) is calculated from the above values.

[Uniformity of cell diameter]

A percentage of the average cell diameter to the standard deviation showing scatter of cell diameters is calculated as follows:

$$U(\%) = (\sigma/d) \times 100$$

wherein d is an average diameter of cells, $\sigma$ is a standard deviation showing scatter of cell diameters, and U is a percentage of $\sigma/d$. The smaller the value of U, the more uniform the cell diameter. The uniformity is estimated as follows:
○: U is less than 35%
△: U is from 35% to 45%
×: U is more than 45%

[Dimensional shrinkage of molded article]

The shrinkage is calculated as follows:

$$\text{Shrinkage }(\%) = \left(1 - \frac{\text{Dimension of the obtained molded article (mm)}}{\text{Dimension of the mold}}\right) \times 100$$

○: The shrinkage is less than 3%
△: The shrinkage is from 3 to 5%
×: The shrinkage is more than 5%

Figure 4:
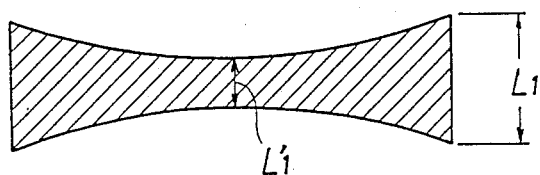
FIG. 4 is a view showing cross-sectional shape of the molded article used for measuring the strain of the molded article.

[Strain of shape of molded article]

$$S(\%) = \left(1 - \frac{L_1'}{L_1}\right) \times 100$$

wherein S is a strain, and $L_1$ is a maximum thickness and $L_1'$ is a minimum thickness of the molded article as shown in FIG. 4.
○: S is less than 3%
△: S is from 3 to 5%
×: S is more than 5%

TABLE 1

| Ex. No. | Length to average diameter of an orifice (mm/mm) | Average cell diameter (μm) | Uniformity of cells | Dimensional shrinkage of molded article | Strain of shape of molded article |
|---|---|---|---|---|---|
| Ex. 1 | 4.0/4.0 | 214 | ○ | ○ | ○ |
| Ex. 2 | 5.0/4.0 | 225 | ○ | ○ | ○ |
| Ex. 3 | 10.0/4.0 | 246 | ○ | ○ | ○ |
| Ex. 4 | 20/4.0 | 271 | ○ | ○ | ○ |
| Ex. 5 | 40/4.0 | 296 | ○ | ○ | ○ |
| Ex. 6 | 60/4.0 | 302 | △ | ○ | ○ |
| Ex. 7 | 100/4.0 | 311 | △ | ○ | ○ |
| Com. Ex. 1 | 0.6/4.0 | 186 | ○ | × | × |
| Com. Ex. 2 | 1.0/4.0 | 192 | ○ | × | × |
| Com. | 150/4.0 | 321 | × | ○ | △ |

TABLE 1-continued

| Ex. No. | Length to average diameter of an orifice (mm/mm) | Average cell diameter (μm) | Uniformity of cells | Dimensional shrinkage of molded article | Strain of shape of molded article |
| --- | --- | --- | --- | --- | --- |
| Ex. 3 Com. Ex. 4 | 200/4.0 | 328 | X | O | Δ |

As shown in Table 1, it was recognized that all of the molded articles obtained in Examples 1 to 7 had excellent quality, that is, they had small dimensional shrinkages and were not strained in their state. On the other hand, the molded articles obtained in Comparative Examples 1 and 2 which were pre-expanded through an orifice member having a ratio of the length to the average diamerter of not more than 4 were large in the dimensional shringage and were remarkably strained since the pre-expanded particles had the average cell diameter of not more than 200 μm, and the molded article obtained in Comparative Examples 3 and 4 which were pre-expanded through an orifice member having a ratio of the length to the average diameter of not less then 100 were small in the dimensional shrinkage since the pre-expanded particles has the average cell diameter of not less than 200 μm, but they were poor in the uniformity of cells and accordingly were strained in their states.

According to the present invention, the pre-expanded particles having cells which are uniform in diameter and have the average diameter of not less than 200 μm can be obtained, and therefore the articles prepared by molding in a mold from the pre-expanded particles are small in the shrinkage and strain, are excellent in the appearance, and are increased in the productivity. Accordingly, the molded articles prepared are utilizable for use of shock absorbing, wrapping materials or structural material such as impact-absorbing materials for cars (for example, a car bumper) which requires excellent dimensional precision and heat insulating building materials.

What we claim is:

1. In a process for preparing pre-expanded particles of a thermoplastic resin which comprises releasing into a low pressure zone an aqueous dispersion of thermoplastic resin particles containing a volatile blowing agent, said dispersion being maintained at an elevated temperature under pressure in a pressure vessel, the improvement which comprises releasing said dispersion through an orifice member with a through-hole having a ratio of the length to the average diameter of 4 to 100.

2. The process of claim 1, wherein said thermoplastic resin is a polyolefin resin.

3. The process of claim 2, wherein said polyolefin resin is a polyproplylene resin.

4. The process of claim 2, wherein said polyolefin resin is a polyethylene resin.

5. The process of claim 1, wherein said ratio of the length to the average diameter is from 10 to 40.

6. The process of claim 1, wherein said dispersion is released through an orifice member having one or more orifices.

* * * * *